United States Patent
Lumsden et al.

(10) Patent No.: US 9,876,907 B1
(45) Date of Patent: Jan. 23, 2018

(54) CALL RECORD PROCESSING MODULE FOR CONTROLLING CALL ORIGINATION IN VOICE AND TEXT-BASED DIALER COMPONENTS IN A CONTACT CENTER

(71) Applicant: Noble Systems Corporation, Atlanta, GA (US)

(72) Inventors: Mary-Tabitha Lumsden, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 15/410,408

(22) Filed: Jan. 19, 2017

Related U.S. Application Data

(60) Provisional application No. 62/280,432, filed on Jan. 19, 2016.

(51) Int. Cl.
*H04M 3/00* (2006.01)
*H04M 5/00* (2006.01)
*H04M 3/51* (2006.01)
*H04M 3/42* (2006.01)

(52) U.S. Cl.
CPC ..... *H04M 3/5158* (2013.01); *H04M 3/42102* (2013.01); *H04M 3/5183* (2013.01)

(58) Field of Classification Search
CPC .. H04M 3/523; H04M 3/42348; H04M 3/432; H04M 3/51
USPC .............. 379/266.07, 266.1, 201.01, 201.07, 379/207.02, 207.03, 207.12
See application file for complete search history.

(56) References Cited

U.S. PATENT DOCUMENTS

| | | | |
|---|---|---|---|
| 7,016,480 B1 | 3/2006 | Saylor et al. | |
| 7,106,843 B1 * | 9/2006 | Gainsboro | H04M 3/2281 379/191 |
| 7,643,616 B1 | 1/2010 | Dianda | |
| 8,358,771 B1 | 1/2013 | Moore et al. | |
| 8,670,787 B1 | 3/2014 | Todd | |
| 8,712,032 B1 | 4/2014 | Leary, II et al. | |

(Continued)

OTHER PUBLICATIONS

Noble Systems Corporation, Maestro 2010.1.1 User Manual, vol. 2, Aug. 3, 2010, 416 pages, Noble Systems Corporation, Atlanta GA 30319.

(Continued)

*Primary Examiner* — Thjuan K Addy

(57) ABSTRACT

A call record processing module retrieves call records from a database associated with accounts to be dialed, either as voice calls or text calls, wherein the called party may have a plurality of postal addresses indicated in the call record. A most restrictive calling window for a dialer by the call record processing module the multiple postal addresses of the account, along with other information in the call record, such as the telephone number. This information is then used to either schedule a time for originating a call or determining whether the call can originate currently. In other embodiments, the determination of the calling window may be modified by other restrictions, such as do not call lists, prior call attempts, state regulations, etc. Once the plurality of potential states are known, various regulations can be consulted for determining whether or when to originate the call.

20 Claims, 9 Drawing Sheets

(56) References Cited

U.S. PATENT DOCUMENTS

| | | |
|---|---|---|
| 8,755,503 B1 * | 6/2014 | Kirchhoff ......... H04L 29/06197 |
| | | 370/356 |
| 8,873,720 B1 | 10/2014 | Ouimette et al. |
| 8,934,870 B1 | 1/2015 | Ouimette et al. |
| 9,172,798 B1 | 10/2015 | Ouimette |
| 9,313,632 B1 | 4/2016 | Ouimette et al. |
| 9,325,841 B1 | 4/2016 | Noble, Jr. et al. |
| 9,350,861 B1 | 5/2016 | Leary et al. |
| 2002/0168987 A1 | 11/2002 | Wang et al. |
| 2003/0027576 A1 | 2/2003 | Fitzpatrick et al. |
| 2005/0064854 A1 | 3/2005 | Jang |
| 2005/0070282 A1 | 3/2005 | Hinz |
| 2005/0215242 A1 | 9/2005 | Black et al. |
| 2006/0148458 A1 | 7/2006 | Komaria et al. |
| 2006/0252438 A1 | 11/2006 | Ansamaa et al. |
| 2006/0286970 A1 | 12/2006 | Otobe et al. |
| 2007/0172050 A1 | 7/2007 | Weinstein et al. |
| 2010/0014497 A1 | 1/2010 | Aggarwal et al. |
| 2010/0157990 A1 | 6/2010 | Krzyzanowski et al. |
| 2010/0246787 A1 | 9/2010 | Ray |
| 2010/0254525 A1 | 10/2010 | Maly et al. |
| 2010/0260327 A1 | 10/2010 | Ray |
| 2010/0285780 A1 | 11/2010 | Collins |
| 2011/0116618 A1 | 5/2011 | Zyarko et al. |
| 2011/0237233 A1 | 9/2011 | Couse |
| 2011/0250902 A1 | 10/2011 | Huang et al. |
| 2012/0257738 A1 | 10/2012 | Mateos Perez et al. |
| 2013/0036184 A1 | 2/2013 | Hung et al. |
| 2013/0053027 A1 | 2/2013 | Lau et al. |
| 2013/0109361 A1 | 5/2013 | Felt |
| 2013/0203439 A1 | 8/2013 | Lifshitz et al. |
| 2014/0185609 A1 | 7/2014 | Efrati et al. |

OTHER PUBLICATIONS

Noble Systems Corporation, Maestro 2010.1.1 User Manual, vol. 1, Aug. 17, 2010, 454 pages, Noble Systems Corporation, Atlanta, GA.

Nobles Systems Corporation, Maestro 2010.4.1 User Manual, vol. 1, Jan. 11, 2012, 486 Pages, Noble Systems Corporation, Atlanta, GA 30319.

Nobles Systems Corporation, Maestro 2010.4.1 User Manual, vol. 2, Jul. 19, 2011, 422 Pages, Noble Systems Corporation, Atlanta, GA 30319.

Noble Systems Corporation, Harmony Version 4.1 User Manual, Sep. 2, 2015, 514 pages, Noble Systems Corporation, Atlanta, GA.

* cited by examiner

CALL RECORD PROCESSING MODULE FOR CONTROLLING CALL ORIGINATION IN VOICE AND TEXT-BASED DIALER COMPONENTS IN A CONTACT CENTER

CROSS REFERENCE TO RELATED APPLICATIONS

This application claims priority to U.S. Provisional Patent Application No. 62/280,432, filed on Jan. 19, 2016, the contents of which are incorporated by reference for all that it teaches.

BACKGROUND

Contact center operators frequently need to contact individuals by originating calls, such as voice telephone calls or text calls, for various purposes. For example, debt collectors may need to contact debtors who are behind on their payments to discuss repayment terms or leave a message requesting the debtor contact them regarding a late payment. Telemarketing calls may be made to those individuals who have expressed an interest in a product. A customer service call may be returned to an individual requiring assistance. Those skilled in the art of contact centers will readily recognize there are various applications for which outbound calls need to be made.

In regards to contacting a party, there may be various applicable state and federal regulations that limit when such calls can be made to the party. This time frame when calls can be made is frequently described as a "calling window", as there is a time limit defined when the calls can start and when they must end (hence, there is a time the window 'opens' and a time when it 'closes'). The calling window is usually defined in the context of a given business day. For example, some federal regulations mandate that telemarketing calls cannot originate earlier than 8 a.m. or later than 9:00 p.m. Other state regulations may apply and may further limit this time. This time is defined in the context of the contacted person, that is, the local time of the called party.

In the past, contact centers could rely on determining the calling window based on the called telephone number, which was a landline number. Even when wireless (e.g., cellular service) telephone numbers were called in the past, the users were frequently located in the same geographic areas. However, wireless users are greater in number, mobile service and costs are more affordable, users have a greater degree of mobility, and many users may even move to different cities, while retaining their wireless numbers. This means that a geographic location of a user may not be correlated with their telephone number.

Because of the growing use of wireless service, SMS text has become more popular. Many regulations now treat a SMS text as a "call", similar to a voice call, for regulatory purposes. Thus, certain regulations may limit when calls may be made to a telephone number, and these regulations encompass both voice calls and text calls. Frequently, the specialized equipment used to originate the voice calls is distinct from the specialized equipment to originate the SMS texts. Further, the specialized equipment initiates SMS texts does not manage the sending of SMS texts based on the calling window of the called party.

Providing an integrated, yet flexible solution, where different dialers can be managed for common limitations by a common component or module provides a less expensive, less complicated solution than attempting to replicate the control module for each of a voice and text dialer.

Thus, attempting to coordinate how/when these text calls and voice calls are made is difficult because the equipment today does not control different forms of dialers with respect to calling window limitations, nor does equipment today control the various dialer's call origination taking into account a plurality of address locations at which the called party may be located.

Finally, conventional equipment today does not take into account regulations from multiple states which may govern the origination of a call, because the called party may be in one of those several states. Thus, there is a need for a common control module that can control different types of dialer components in a call center, where control of call origination is controlled in a common and consistent manner taking into the different locations and associated regulations that the called party may be located in and which the call must comply with. It is with these and other limitations that the concepts and technologies are disclosed herein, in order to avoid duplicating functionality and capabilities in multiple call origination systems.

SUMMARY OF INVENTION

In one embodiment, a call record comprising a telephone number and a plurality of addresses for the called party is read from a database, and an appropriate calling window is determined for transmitting a call origination signal to a dialer to originate a call, wherein the call may be either a voice-based or text-based call. The determination of the calling window is based on determining the corresponding locations associated with the addresses and the telephone number. A western-most location and an eastern-most location is determined and then used to determine the starting and stopping time associated with the calling window for the dialer, which is located in a dialer-located time zone. In other embodiments, the calling window may be adjusted taking into account regulations from each of the states associated with the locations of the addresses and telephone number.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
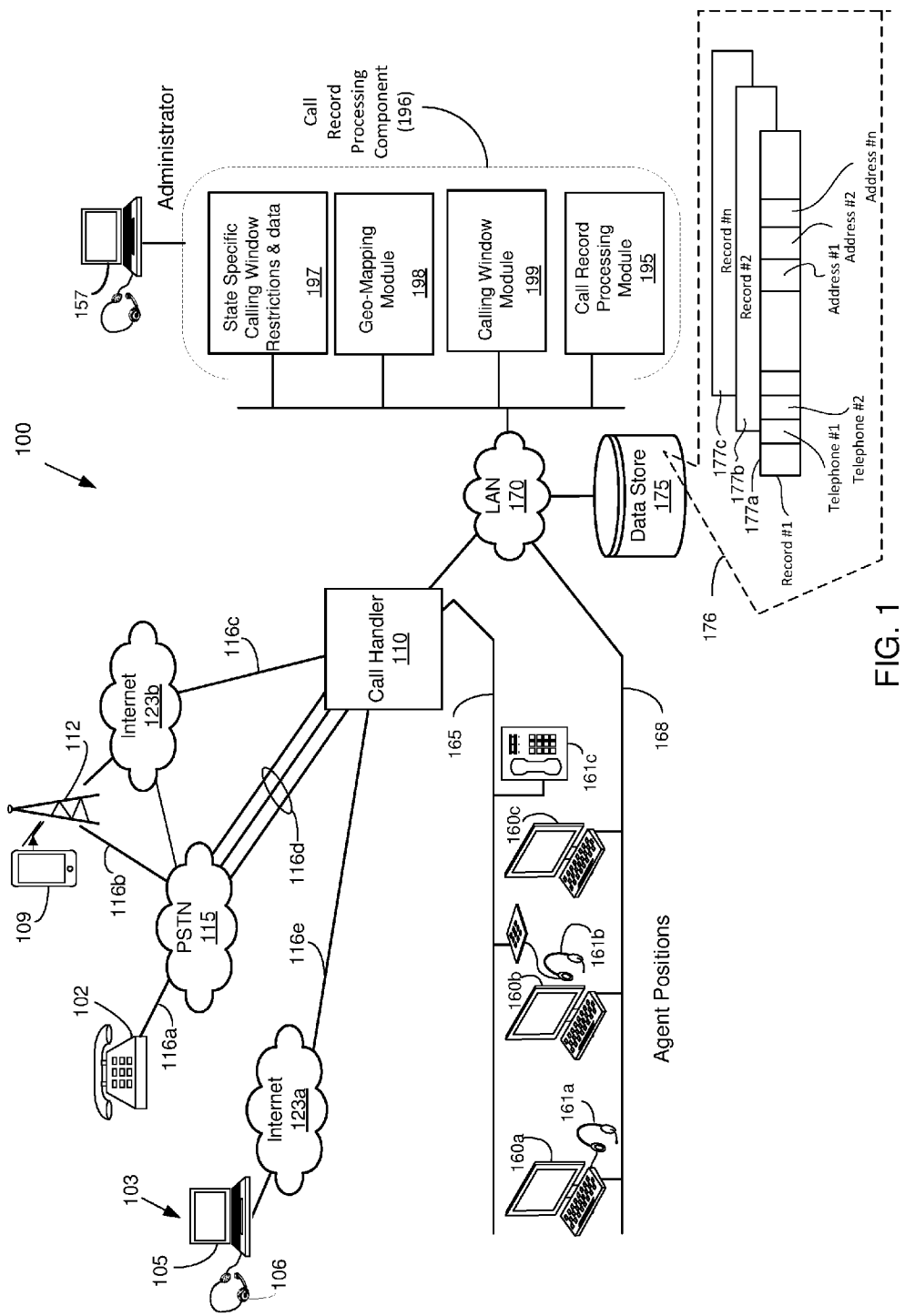
FIG. 1 shows an embodiment of a contact center architecture illustrating the technologies disclosed herein according to various embodiments.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The "calling window" is term of art referring a time period during which contact center operators may originate calls to called parties. The calling window is generally recognized as being a reasonable time period for the general population to receive calls, given that most people are awake during the day and sleep at night. In many contexts, a default starting time of the calling window is 8:00 a.m. and the default stopping time is 9:00 p.m. Certainly, for any generalization, there are exceptions. There are some people who may be "night-owls," who may work a late shift and sleep during the day, but these are considered the exception as opposed to the norm. Thus, in many contact center calling applications, a default calling window is based on these times.

It should be noted that the calling window of 8:00 a.m. to 9:00 p.m. is based on the local time of the called party. The contact center may be located in a different time zone, and so a different calling window must be determined for the time zone where the dialer is located.

Complicating Factors

It is important that the calling window is properly determined, because calling individuals outside of the allowable calling window may be deemed as harassment and an inconvenience to the called party. Furthermore, doing so can expose the contact center to liability and violate various state/federal regulations. Hence many companies strive to avoid calling individuals outside of the allowable calling window. However, there are various factors that complicate determining when a call is within the allowable calling window for a particular called party. For example, the regulations defining the calling window were passed decades ago, when most calls were being made to individuals at landline telephones, which were associated with traditional telephone service, as oppose to mobile telephones.

It is also useful to understand how the format of current telephone numbers were developed. A telephone number has a specified format and comprises a three digit area code, also referred to as a numbering plan area or "NPA." Each NPA was associated with a geographical area, and could be associated with a city, portion of a state, or even an entire state. In the past, the area code was not required to be dialed on each local call, but for various reasons, this value is often required to be explicitly dialed for local calls.

After the area code, a local telephone number follows, which comprises a seven digit number. The local telephone number is in the format of a three digit central office exchange (a.k.a. central office code) which is sometimes represented as "NXX". Next, is a four digit number, also sometimes referred to as a line number and represented as "XXXX." The combination of area code and central office code is referred to as the NPA-NXX and the full 10 digit number could be represented as NPA-NXX-XXXX. For wireline service, the NPA-NXX would identify a particular telephone switch exchange in an area code, which narrowed the serving area to a particular local region (such as a portion of a city). Thus, knowing the NPA-NXX allowed a determination of where the subscriber was located. This could be accomplished using databases (or tables) that are readily available that map each NPA-NXX to a city/state location. Thus, knowing the NPA-NXX allows ready identification of the location, and hence time-zone, of the called party. One skilled in the art would understand that the NPA-NXX is associated with a location, and the NPA-NXX could be hence referred to as "being at a location." This means the central office was based in a location, and the wireline subscribers would be within a certain distance from that central telephone office. Further, one skilled in the art would know that each location is associated with a time zone, and hence each NPA-NXX was also "located" in a time zone. Once the time-zone is known, then knowing the calling window for the called party could be determined. Once the calling window is known (relative to where the dialer is located), then this would allow a determination of whether (or when) calls could be originated.

It is often the case that the equipment originating the call may not be in the same time-zone as the called party. Thus, just because it is 9:00 a.m. where the dialing equipment is located, does not mean it is 9:00 a.m. for the called party. The called party may be located in a different time zone and it may be e.g., 7:00 a.m. or even 6:00 a.m. local time for the called party. For purposes herein, the "dialer-located time zone" refers to the time zone where the dialer is located in. For example, the dialer can be located in an Eastern Time Zone state and the called party may be in a Pacific Time Zone state. This would mean the dialer-located time zone is the Eastern Time Zone. Thus, originating a call at 9:00 a.m. in the Eastern Time Zone by the dialer would result in the called party in the Pacific Time Zone receiving the call at 6:00 a.m. their local time. The calling window for the dialer in the dialer-located time zone may be different or adjusted in order to accommodate called parties in different time zones. This may have to be adjusted for each party being called.

It is fairly straightforward to determine an allowable calling window when the called number is a wireline number, since the location and the time zone of the called party can easily be determined. However, more people today have wireless cell phones, and there is no requirement that the NPA-NXX portion of the wireless number correlate to a location where the user actually is located when using the mobile phone. Many people obtain a cell phone (and are assigned to a NPA-NXX) associated with their local area, but then relocate to another portion of the country while keeping their cellular number. Thus, while a wireless number may have a 212 area code (typically associated with New York City), that individual may have relocated to Los Angeles. Thus, while there is a probability that a wireless telephone number with a 212 NPA is associated with a party presently located in New York City or in the Eastern Time Zone, that is not always the case.

Contact centers calling a particular individual may also maintain address information of the called party. This may be a street address of their residence or a mailing address. Typically, this will include zip code information and/or city/state information. The zip code can be then mapped to a time-zone. Also, since the address information typically includes city/state information, that information can be used as well for ascertaining the time-zone. Thus, an individual with mobile phone having a 212 area code (NPA) is typically associated with New York City and that individual may also have a New York City address. In this case, it may be safely presumed that the individual is usually located in the Eastern Time-Zone. Thus, a contact center originating a call to a mobile telephone number of a called party in New York and having an address for that called party in New York may assumed that the person is in the Eastern Time Zone. If the number were a wireline number, then it would be clear what time zone is involved.

However, the above assumption for mobile telephone numbers may not always be correct. The individual may have multiple address locations where they live or have lived. Some individuals may live in New York City, but have a second residential address in Los Angeles because they spend much time working in Los Angeles. Thus, a contact center may have information regarding two residential addresses for that individual. Further, consider the example of a student in college. They may have a home residential address, which corresponds to their parent's address. They may have an address while they are attending school. They may intern during the summer at a company in another town, and have yet a third address. Finally, they may graduate and move to another location for work, and thus may have a fourth address on file with the contact center. While a person may be residing at a single address at a given moment, the records maintained in a contact center may not know which addresses are obsolete, which are rarely used, and which address should be currently used. Further, the student may only have a mobile telephone number, as opposed to a landline at each of the locations. Thus, when attempting to contact this individual, e.g., in regard to a student debt, there may be a number of addresses maintained by the debt collector for that individual. The contact center may not know with certainty which one of the several addresses should be used at any given time. It may be unrealistic to expect the individual to update the contact center each time the individual moves or resides at a different location. Furthermore, it can be readily appreciated that the time-zones of each of these addresses may be different from each other. For example, the student may have a home in California, went to school in New York, interned in Chicago, and got a job in Denver. This increased mobility of individuals complicates the analysis of determining the calling window of the party, because the calling window is predicated on knowing which time-zone the called party is located in, or may be located in.

The contact center may have other challenges in determining the appropriate calling window for contacting the party. While federal regulations may limit the calling window to 8:00 a.m. to 9:00 p.m. (local time of the party), state regulations may be more restrictive. Depending on the purpose of the call and the state that the individual is associated with, each state may have variations on when it is appropriate to call the party. For example, some states may limit calls only to 8:00 p.m., instead of 9:00 p.m. Other states limit calls to no later than 7:00 p.m. Other states prohibit certain calls before 10:00 a.m. or prohibit certain types of calls on Sundays and/or holidays. There are various restrictions that may apply depending on which state the called party is presumed to be in and the purpose of the call. In addition, each of the states may have their own do-not-call databases, which prohibit any telemarketing calls to numbers listed therein. The consultation of the various possible states may be avoided if it is known with certainty where the party is located. Typically, the party does not provide updated information to all the possible entities that may desire to contact them.

One solution for a contact center attempting to call the individual with the allowable calling window is to use the most restrictive set of limitations that may be applied based on information on file for the called party. This information may include the telephone number and the various residential addresses on file for the called party. This requires determining the time-zone not only based on the telephone number being dialed, but for each of the addresses on file for the called party. For example, the individual may have addresses associated with the Pacific Time-Zone and the Eastern Time-Zone. If so, then it can be presumed safe to call them after 11:00 a.m. eastern (which equates to 8:00 a.m. pacific time). Similarly, calls should cease after 9:00 p.m. Eastern time, even though this would mean that if the party is actually in the Pacific Time-Zone, they would not receive calls after 6:00 p.m. Pacific Time.

As noted above, each state may have its own restrictions as well. For example, California may prohibit certain types of calls prior to 9:00 a.m. (as opposed to 8:00 a.m.). Thus, if it is not known whether the party is presently in California or not, calls should not be made earlier than 9:00 a.m. pacific time, which is 12:00 p.m. eastern time. Thus, the calling window may be then adjusted to be between 12:00 p.m. eastern and 9:00 p.m. eastern, reflecting the most restrictive calling window of the respective states involved.

Complicating the analysis is that certain locations may or may not observe daylight savings time. This may be determined on a state or city basis. For example, Hawaii does not observe daylight savings time, and there are various other cities bordering adjacent time-zones that may not observe daylight savings time. Thus, determining the local time for a called party may involve ascertaining whether the corresponding location observes daylight savings time.

It may be tempting to simply use the zip code of an address of the called party to determine their location. It would appear that this would be sufficient to identify the state in which the party is located. However, complicating this analysis is the fact that there are some zip codes (at least 13) that straddle state lines. Thus, knowing the zip code does not by itself may not ensure that the state has been uniquely identified. It may be presumed that if the zip code is not one of the 13 exceptions, then the zip code may be used to ascertain the state, and from there, any associated state restrictions may be identified.

It is possible to collect each state's various restrictions in a set of state-specific limitations in a database. This would readily allow each state-specific limitations to be readily determined once the state of the called party is determined. If the called party is associated with several states, then the set of corresponding state-specific limitations can be determined and the most restriction limitation could be applied. For example, if a called party has two addresses on file, one for State A and one for State B, and State A allows calls between 8 a.m. and 9 p.m. any day of the week, but State B prohibits calls on Sunday, then if it is currently Sunday, no calls should be made, since that is the more restrictive limitation.

Of course, if the called party has indicated that only one of the addresses is current, and the others are obsolete or never applicable, then the call center may retain those addresses with the indication that they are past addresses, and not potential current addresses. That would allow the contact center to label only one address as a valid address, and avoid having to utilize analyzing and determining the most restrictive limitation.

Exemplary Architecture

FIG. 1 shows an illustrative architecture of a contact center. The call handler 110 is used to originate and/or receive calls. For purposes of illustration, the concept and technologies are explained in the context of outgoing calls from the contact center to a called party, since determining a calling window is relative to outgoing calls from the call handler. Nothing precludes the call handler 110 from also handling incoming calls, though.

Calls originated by the call handler 110 may be provided to the Internet to 123b using facilities 116c to a mobile (cellular telephone) provider 112 and then to a mobile user 109. Calls may also be delivered by the call handler to the Internet 123a using facilities 116e, which may be associated with e.g., a cable network provider that provides VoIP service. These calls may be routed to a VoIP device, such as a computer workstation 103 comprising a computer 105 and a headset 106. In other embodiments, calls may originate by the call handler and routed over conventional telephone facilities 116d to a public switched telephone network (PSTN), which in turn routes the call to a conventional telephone 102 using a local loop 116a. In other instances, the call to the PSTN 115 may interwork to the Internet 123b or to the mobile carrier 112 over facilities 116b. Thus, a variety of facilities, technologies, and protocols may be used to originate the call from the call handler 110 to the destination party. FIG. 1 is only one example, and those skilled in the art will recognize other configurations area possible.

As will be seen, the call handler may originate the call in response to preceding events in various ways. In one approach, the call handler may receive (or retrieve) a list of call records, where each of the call records has been processed so as to determine the appropriate calling window. This processing is typically done by the call record processing component ("CRPC") 196. The CRPC may provide the call handler with a set of call records which can be originated in the current hour. Then, at the next hour, a new list is provided to the call handler, during which those records can be originated in that hour. In this way, the call handler does not have to ascertain whether it is appropriate to originate a call, it presumes that the presence of the call record in the list means that the call can be originated.

In another approach, the call handler may retrieve a list of call records from a data store 175 and ascertain for each record whether it is appropriate to originate a call by asking, or originating a query, to the CRPC. Thus, the call handler retrieves a call record, asks the CRPC if it is okay to originate a call, which requires the CRPC to ascertain the calling window for that record in real time.

In another approach, the CRPC may retrieve the list of call records, and ascertain the appropriate calling window for each record, modify the record to indicate such, and store it in the data store. Then, at a subsequent time, the call handler can retrieve the list and search for call records that can be dialed at the current time. Furthermore, those skilled in the art will recognize that other variations are possible.

In any of these variations, the CRPC 196 may access via LAN 170 to retrieve (or be provided with) a calling list. The CRPC may obtain this from the data store 175 or from the call handler 110. The calling list 176 may comprise a series of call records 177a-177c. Each call record may have one or more telephone numbers for the party to be called, and one or more residential addresses representing current and/or past residences. The call record processing module 195 of the CRPC is the module that receives and parses the call records, as well as transmitting any modified call records or lists.

The residential addresses may be more accurately referred to as mailing or postal addresses, since a party may indicate a post office box as their address, and which may be used as a substitute for their residential address by an enterprise. In other words, not all postal addresses necessarily indicate a residential street location of the person, but they typically indicate the location where the individual lives. To encompass either situation, the generic term of "address" or "postal address" is used, which refers to indicate a location of the individual's residence or their mailing address.

Further, the plurality of mailing addresses maintained in the call record for an individual may be designated therein in various ways. Each address could be designated as being a primary address, current address, secondary address, prior address, obsolete address, etc. In many instances, it may be that more than one address is considered valid, or potentially valid, for the individual. This is not necessarily, but may be used to indicate whether it is known that just one address should be used in determining the calling window or whether more than one should be used.

In one embodiment, the CRPC 196 processes the call records using the telephone numbers and/or address information to ascertain a calling window. This may involve the call record processing module 195 ingesting or receiving the records and identify the various fields, such as the telephone numbers and addresses. In various embodiments, there may be only a single telephone number, a single telephone number with a single address, a single telephone number with multiple addresses, or multiple telephone numbers with multiple addresses.

For each record, the telephone number and/or addresses are used to ascertain geo-location information. In one embodiment, a single telephone number and two or more addresses are used. This requires determining corresponding geo-location information for the number and addresses. Geo-location information is information that reflects location information. This determination maybe performed in one embodiment by a geo-mapping module 198 accessing a geo-mapping table or database to determine a nominal geo-location based on the NPA-NXX of the telephone number. Each area code is typically associated with a geographical area, and the central office code is further associated with a subset of the area within the NPA area. Once a geo-location(s) is known, then the corresponding time zone can readily be determined using a database lookup. If there are multiple addresses, then multiple geo-locations are determined. The processing of multiple geo-locations is discussed below in conjunction with multiple addresses. With address information, the city/state or zip code information can be used to determine a geo-location either explicitly (e.g., the city/state directly indicates a location) or implicitly (e.g., the zip code implicitly indicates a location). Once the geo-location information is known, the time zone can be ascertained. For telephone numbers, a table lookup using the NPA-NXX can be performed to ascertain a geo-location.

Contemporaneously, once the geo-location is known, regulatory information specific to the state can be retrieved, which may impact the calling window determination. For example, some states do not observe daylight savings time. Some states may limit certain types of calls on certain days to be within a certain calling window—in effect, a state may alter a default calling window for special circumstances. Other regulations may be defined for that state that impact the allowable calling window.

Once all this information is obtained, it is provided to a calling window module 199 that uses the information to ascertain the calling window for that record. The calling window is defined by a starting time and a stopping time. This is the time period during which a call to that telephone number for that individual can be originated. Typically, a default calling window is presumed to start at 8:00 a.m. and end at 9:00 p.m. (local time relative to the called party). This default time is typically modified by making it more restrictive based on state regulations. That is, the starting time may be advanced past 8:00 a.m. and the stopping time may be advanced earlier than 9:00 p.m. relative to the local time of the called party. Once that is determined, that calling window time needs to be transformed or adjusted to a local time relative to the call handler originating the call, which depends on the time zone where the dialer is located.

The above embodiment may process an individual record (or small group of records), with the results provided to the call handler. Or, the embodiment may be defined to process the entire list of records, which is then stored in the data store 175 for later retrieval by the call handler. Or, the embodiment may process a list to segregate the records into sub-lists, which represent those records which can be originated in the current hour. For example, the CRPC may process the entire list of records, and sort them into separate lists based on their respective starting time. Then, the CRPC may provide the appropriate list at the appropriate time to the call handler 110. For example, the CRPC may create a list for the call handler to call from 8:00 a.m. to 9:00 a.m., another one from 9:00 a.m. to 10:00 a.m., etc. Thus, each hour a new calling list could be provided to the call handler. Other variations are possible as to how the processed records may be stored/indicated.

In one processing mode, a single or small group of records may be retrieved by the CRPC, and those which are able to be originated at the present time are sent to the call handler 110. The call handler may originate the calls and connect an available agent using the facilities 165 to the call. The facilities 165 may convey audio data to a stand-alone phone 161c, a headset 161b, or to headset 161a integrated into a computer 160a. The call handler 110 may also present the agent handling the call with corresponding data from that account on their computer 160a-160c as appropriate, using facilities 168.

For each of the telephone numbers and addresses, geo-location information is obtained. That will correlate to a particular state, which may have implications as to whether the call can be originated at the current time. Even if there is only a single telephone number and address in the call record, the geo-location of the telephone number may be in one state (e.g., California) and the address may be in another (e.g., New York). This may require considering the regulatory limitations of both states if it is not certain as to which state the called party is presently located in. Thus, one state may have a prohibition from calling on a state specific holiday, or other state-specific restrictions. This means the calling window not only has to consider the calling window for each geo-location, but the corresponding regulatory limitations.

The calling window module 199 may receive a record that is going to be dialed, and it will examine the telephone number to be dialed, and use that number and the various addresses indicated in the record to execute the above identified algorithm. That may require the calling window module 199 access a geo-mapping module 198 which may contain or access mapping of information of geographic locations and/or time-zones. For example, the geo-mapping module 198 may have various sub-tables used for mapping a zip code to a location or a time-zone. Further, the geo-mapping module 198 may map a city/state to a time-zone. Or, it may map an NPA-NXX to a location. It may be that a series of lookups may have to be performed. For example, if the zip code is used to determine a city/state, then another table may be accessed for mapping city/state to a time-zone.

This allows the calling window module 199 to determine the most restrictive calling windows based on both the telephone number being dialed and the multiple addresses. The calling window module 199 may default to using only the telephone number if there is no address. If there is an address, and the address corresponds to the same time-zone as the NPA-NXX, then it may be that respective time-zone is used, regardless of whether there are other addresses indicated. If there is both a NPA-NXX and address(es) in other time zones or locations, then a most restrictive calling window may have to be determined. The most restrictive calling window defines the time period that the dialer can originate calls given that the called party may be in any of the locations used to determine the most restrictive calling window.

Next, the state-specific calling window restrictions data are accessed. This includes information as to state-specific calling window times, along with other related exceptions for holidays or other occasions that limits calls. For example, some states, such as Indiana, largely prohibit using automatic dialing and announcement devices (ADAD) for certain calls. Other states may prohibit certain types of call on Sundays, or within certain time windows that are more restrictive than federal regulations. Thus, this may be used to augment or otherwise modify the determination of the calling window for that account.

Essentially, each state location must be used to ascertain whether it defines a limit relative to the most restrictive calling times that can be used for determining when the calling window opens and closes. Once this has been determined, then that calling window can be used to originate calls to that number by the dialer.

Selection of Channel Specific Dialer

A "dialer" as used herein, refers to the specialized call origination component(s) found in a contact center that originate calls, which may be in the form of either a voice call or a text call. In various regulatory contexts, a SMS text directed to a telephone number is a "call" just as is a voice communication directed to that telephone number. Hence, equipment that originates either form of communication is referred to as a "dialer."

A text (i.e., short message service or "SMS") dialer originates an SMS text to an indicated telephone number, whereas a voice dialer originates a voice call to the indicate telephone number. These difference forms of communication are referred to as "channels" and hence a text channel type refers to text-based communications and a voice channel type refers to voice (telephone call) based communications. These can be also simply referred to as a voice call or text call.

A text dialer can originate the SMS message in a format as defined by the Request for Information ("RFC") 5724, published by the Internet Engineering Task Force, as of January 2010. Other formats may be used, as is known to those skilled in the art. The message format may be provided to a SMS gateway and to a service provider that provides routing capabilities to the appropriate service provider. The voice dialer can originate calls to the PSTN using conventional time-division multiple access ("TDMA") protocols, such as those used in conjunction with T1 facilities or ISDN primary rate access. In other embodiments, the voice may be a voice over IP ("VoIP") call, which is originated using a session initiation protocol ("SIP"), and H.323 protocols, a media gateway control protocol ("MGCP"), real time protocol ("RTP") and real time transport control protocol ("RTCP"). Other proprietary or non-standard protocols and formats may be used as well.

Conventional equipment in a contact center originating SMS calls is not managed and control in the same manner as a voice-based dialer. Typically, these are separate components and the SMS call origination equipment conventionally does not have any controls with respect to managing SMS calls with respect to calling windows, tracking or limiting call attempts, checking state regulations, etc. This presents a challenge to contact center operators which have to manage voice-based dialers and text-based dialers in a common manner. For example, a contact center operator originating calls must determine a suitable call window based on the dialed number, but doing this for both voice and text calls is a challenge, since it is typically not required or performed for text calls. Further, determining a suitable call window taking into account a plurality of address location is something that contact center operators have not been required nor perform for either voice or text calls. While an obvious solution may appear to replicate this capability and functionality in both the voice dialer and the text dialer, this provides a number of disadvantages, including replicating functionality which has to be managed separately, but in a consistent manner. This complicates management because any modification to the control of one type of dialer may have to be coordinated with the corresponding modification to the other form of dialer. Finally, this increases the cost of the SMS text-based dialer, and may require additional processing capacity, memory, etc. Further, there is no guarantee that the SMS text dialer vendor will even provide such upgrade, nor if the dialer is even capable of such upgrade. Thus, having a common control structure that performs these compliance functions, such as determining the appropriate calling window for both dialer types is a distinct and measurable advantage in the operation of these components. By defining a separate CRPC (either as a logical or physically separate module) each dialer does not have to be upgrade, managed, and administrated separately. This provides the call center operator with a more timely, efficient, and less expensive approach to managing equipment and ensuring all calls by all dialers confirm with the calling window and state regulations impacting the same.

The call record may have an indication as to whether the call record should result in a voice call or text call being initiated. If so, this may be reflected by a flag or other form of indication in the call record. The CRPC may segregate the records by channel type and may send the corresponding records to the corresponding dialer type. This is shown in FIG. 2.

Figure 2:
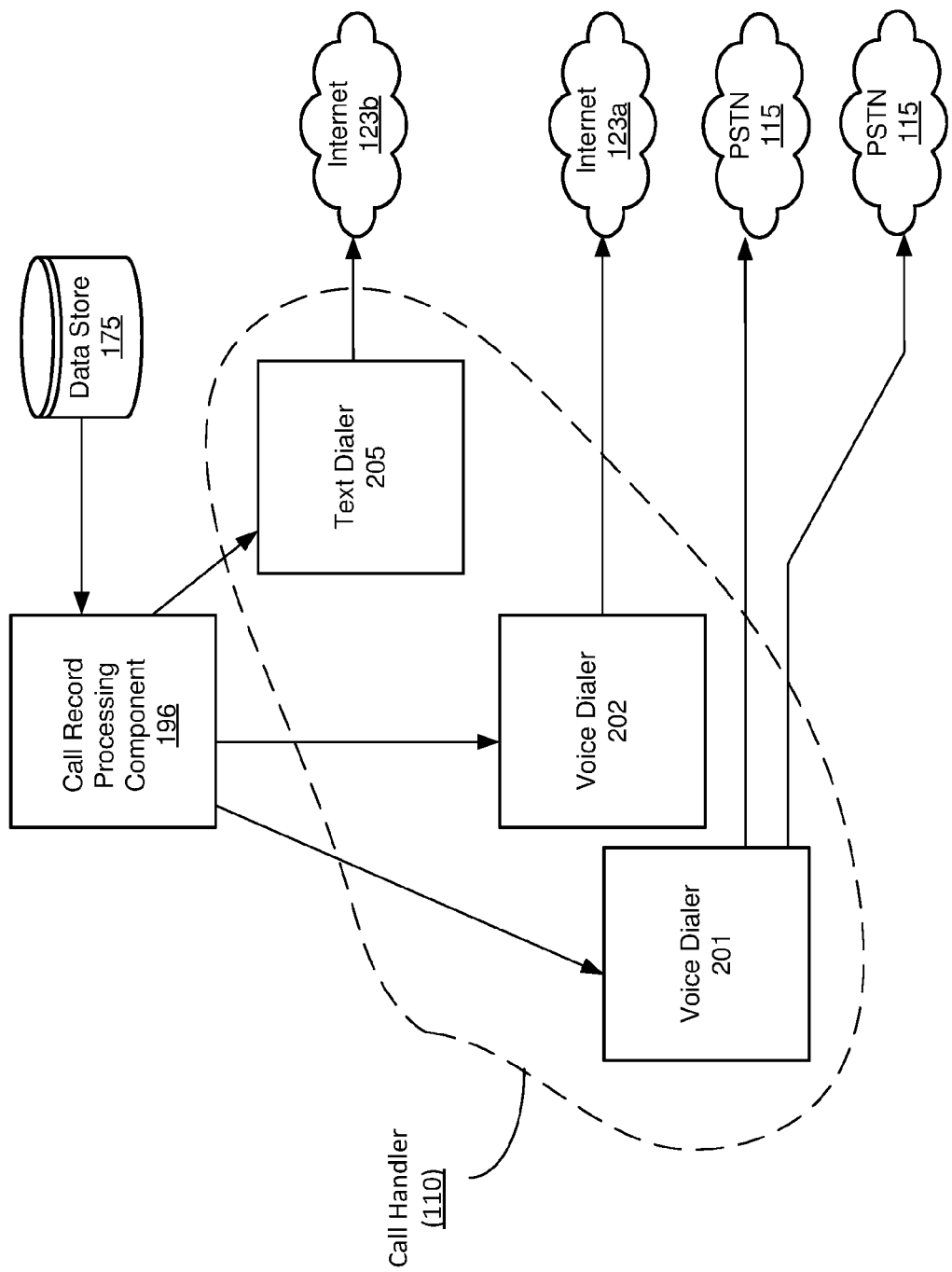
FIG. 2 shows additional details of the call handler and call record processing component in the contact center architecture according to one embodiment.

Turning to FIG. 2, the CRPC 196 may retrieve call records or calling lists from the data store 175 and process them to identify the appropriate calling windows for each record. It is presumed that text-based calls should also originate within the corresponding calling window for that call record. Once the calling window is determined for a call record, then the CRPC may transfer that information to the corresponding voice dialer 201-202 or text dialer 205 within the call handler 110. This may be transferred one record at a time, in response to a query, etc.

The text dialer 205 is shown as connected to the Internet 123b, which may be a specialized service provider for conveying text messages to mobile carriers. FIG. 2 also shows a plurality of voice dialers 201-202, which may be geographically remote dialers from the CRPC, and may interface with different type of communication networks. For example, voice dialer 202 may originate VoIP calls using SIP (session initiation protocol) to the Internet 123a, whereas voice dialer 201 may originate voice calls using ISDN PRI or other facilities to the PSTN 115.

Although FIG. 2 shows the CRPC as being a separate component from the components comprising the call handler 110, in other embodiments, the CPRC 196 and dialers 201, 202, and 205 may be embodied in the same physical processing system or grouped as components into a single logical system. A variety of physical configurations of these components are possible.

Figure 3:
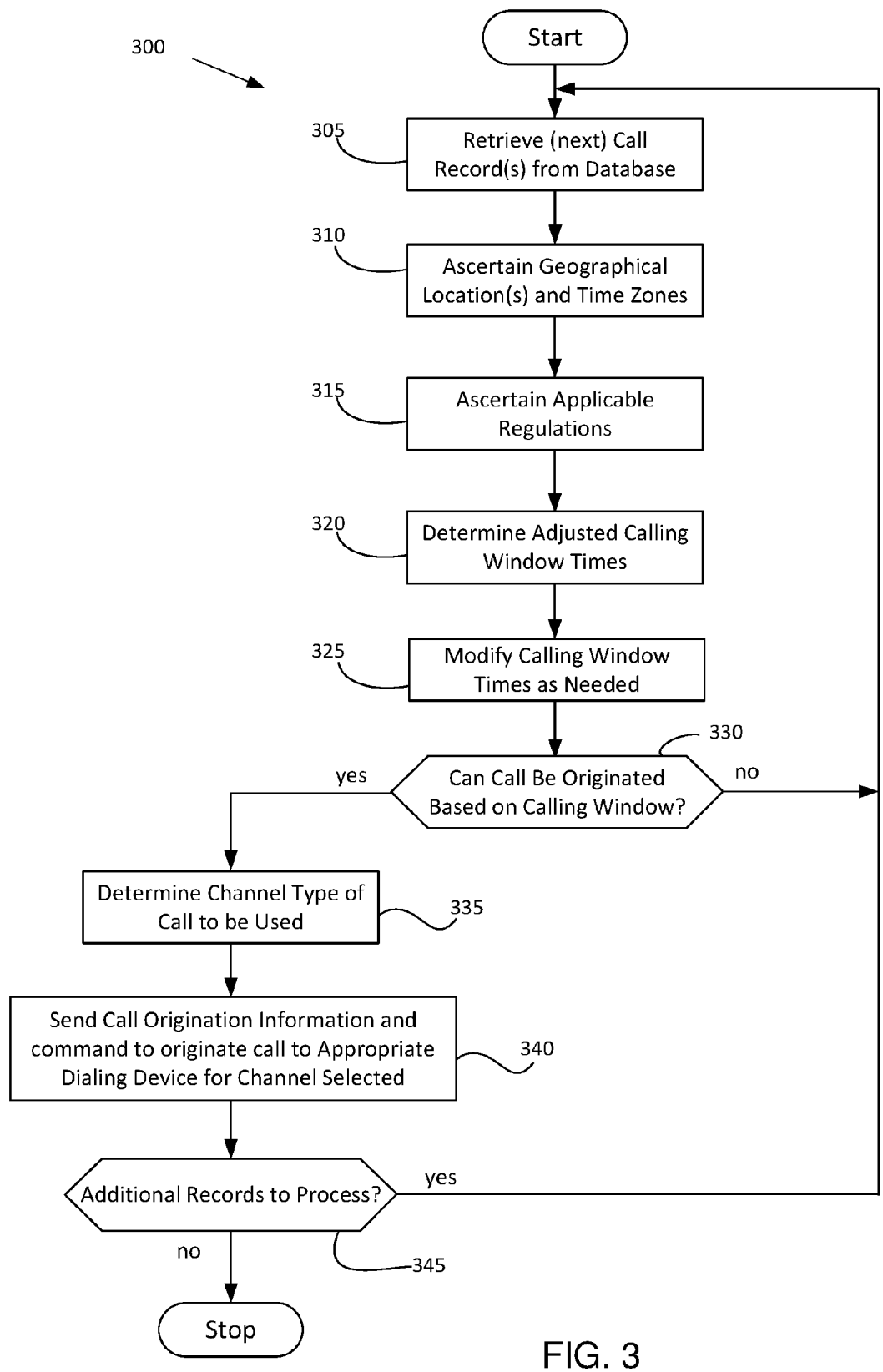
FIGS. 3-6 shows various embodiments of process flows for processing a calling list comprising records according to the concepts and technologies disclosed herein.

Process Flow—FIG. 3

One embodiment at a high level of the process flow associated with the CRPC and call handler is shown in FIG. 3. This embodiment represents the processing of a record by the CRPC and sending information to an appropriate dialer in the call handler to then originate the call. The process flow begins with retrieving a call record from the database in operation 305. This may be the entry point for a loop, so that if the process has executed previously, then the process involves getting the next call record as opposed to the first record. In other embodiments, the fetching of information from the database may involve fetching multiple records at a time, and then processing each individually. This avoids having to fetch only one record at a time from the database. The fetches can occur periodically or after so many records in the prior fetch are processed.

In this embodiment, the next operation involves ascertaining the geographical locations and time zones associated with the called party in operation 310. This involves ascertaining a geographical location associated with the telephone number being dialed, along with the geographical location associated with each of the address locations listed as applicable for that called party. Certain address locations may be indicated as a primary and/or secondary address, which means both are potentially applicable to determining the calling window, whereas other addresses may be listed as "obsolete" and are not used. Typically, at least one address is used along with the telephone number to ascertain at least two geo-locations.

For the telephone number, the NPA-NXX portion is used to ascertain the geo-location. This may involve using the NPA-NXX in a lookup table to determine a city, state, or time zone. In some embodiments, determining the city or state may then be used to identify the time zone. For the address information, the city, state, and/or zip code is indicated, and that can be used to directly ascertain a time zone. In some rare instances, if the zip code is used (which may straddle state lines), then the state information may have to be used.

Next, the geo-location, namely the state, is used to ascertain whether there are any state specific regulations to be applied in operation 315. These may modify the application of the default calling window start and stop times. For example, certain types of calls may be prohibited on certain state holidays, such as "All Saints' Day" in Louisiana, which occurs in early November or "Pioneer Day" in Utah, which occurs in July. Other regulations may limit when the calling window opens. For example, while many states adhere to the federal guidelines of allowing telemarketing calls between 8:00 a.m. and 9:00 p.m., Alabama has a stop time of 8:00 p.m. Other states, such as Illinois have a start time of 9:00 p.m. Some states, such as Mississippi, prohibit all telemarketing calls on Sunday. Rhode Island has a stop time of 6 p.m. Monday-Friday, but stops at 5:00 p.m. on Saturday. There are other states having other deviations from the 8:00 a.m.-9:00 p.m. default times. These modifications to the default calling windows need to be determined for each of the different states that are associated with the called party. Each of the restrictions need to be examined to ascertain how they could modify the default calling window.

Once the geo-locations and associated regulations are known, then it is possible to ascertain the adjusted calling window times. The term "adjusted calling window times" refers to the calling window described in reference to the location of the dialer (i.e., the dialer-located time zone), as to when the dialer can originate allowable calls to the called party, recognizing the various locations that the called party may be located in. For example, assume the dialer and the called party are located in the same state in an Eastern Time Zone, which allows calls from 8:00 a.m.-9:00 p.m. The adjusted calling window for the dialer is the same: 8:00 a.m.-9:00 p.m. (Eastern Time Zone). However, if the dialer is located in the Central Time Zone, then the dialer can originate calls to the called party from 7:00 a.m.-8:00 p.m., since those times correlate 8:00 a.m. to 9:00 p.m. in the Eastern Time Zone. Now, if the called party may be either in the Pacific or Eastern Time Zone, then the adjusted calling window for the dialer is 10:00 a.m.-8:00 p.m. Calls made between this calling window will always be between 8:00 a.m. and 9:00 p.m. local time for the Pacific or Eastern Time Zones. Further information on how this can be determined is described below.

Once the adjusted calling window is determined, there may be further adjustments made in operation 325 based on the regulatory restrictions for the various states involved. Thus, for example, if the called party could be located in either Mississippi or Georgia based on telephone number and address information, and the current day is a Sunday, then a telemarketing call would be prohibited in Mississippi, but not Georgia. The calling window is adjusted to reflect no time between the starting and stopping time. The most restrictive approach is used, if it is not known for certainty which location the user is located in.

Once the final calling window times are determined in operation 325, a test can occur in operation 330 to determine if the call can be originated to the called party. If the answer is no, then the process loops back to operation 305 to process another record. In other embodiments, if the answer is no, the record may be placed in a queue for subsequent examination. Since time zones and calling windows are defined on integer hours, it is possible that a calling window start time may open in the next hour, or in next two hours, etc. Thus, in one embodiment, the call records which are set aside at this step of processing may be reexamined each hour, at the beginning of the hour. In other words, if the calling window starting time has not yet occurred for a record or set of records, the calling window may open up in the coming hour.

If the called party can be called, then a determination is made in operation 335 as to the channel type to be used. In this embodiment, the call may be either a voice call or a text call. Once this is determined, a signal comprising the call origination information, such as the telephone number, may be sent to the appropriate dialing device in operation 340. Further, information may be explicitly or implicitly conveyed that the dialing device is to originate a call to that number immediately, or when the next available opportunity arises. This operation may be manifested by transmitting the call record to the dialer by the CRPC or indicating in some other form that a call should be originated by the call handler. For example, transferring a list of records which open up on the upcoming hour implicitly indicates that the dialer can originate calls at that time.

Next, at operation 345 a test is made to determine if there are additional records to process. If not, the process terminates. If there are more records, the process loops back to operation 305 where the next record is processed. This overall loop may be a subset of another loop that retrieves a group of records from the database, and operation 305 is replaced with retrieving the next call record from cache. Those skilled in the art will recognized that groups of records can be retrieved and the processed individually in smaller groups.

Figure 4A:
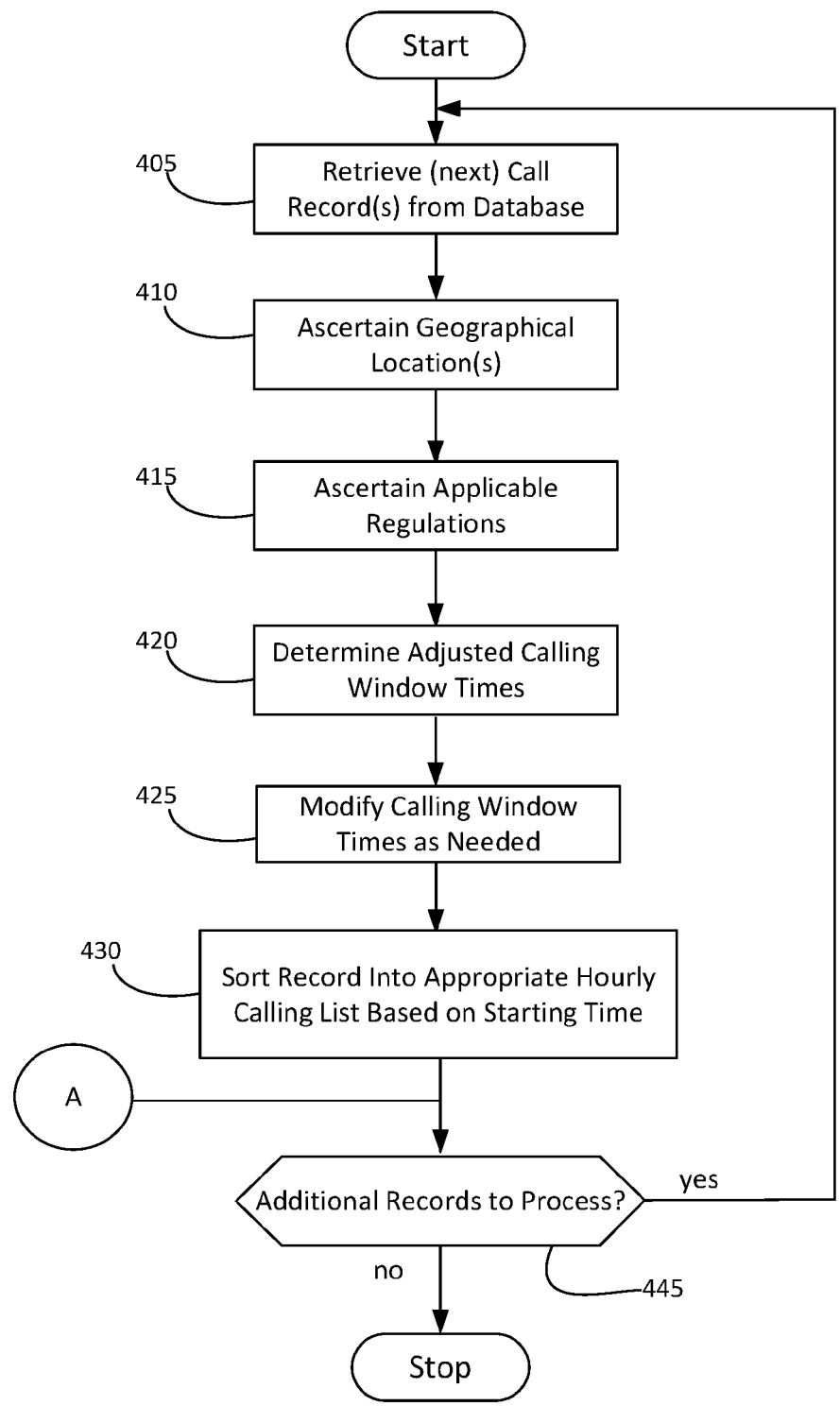
Figure 4B:
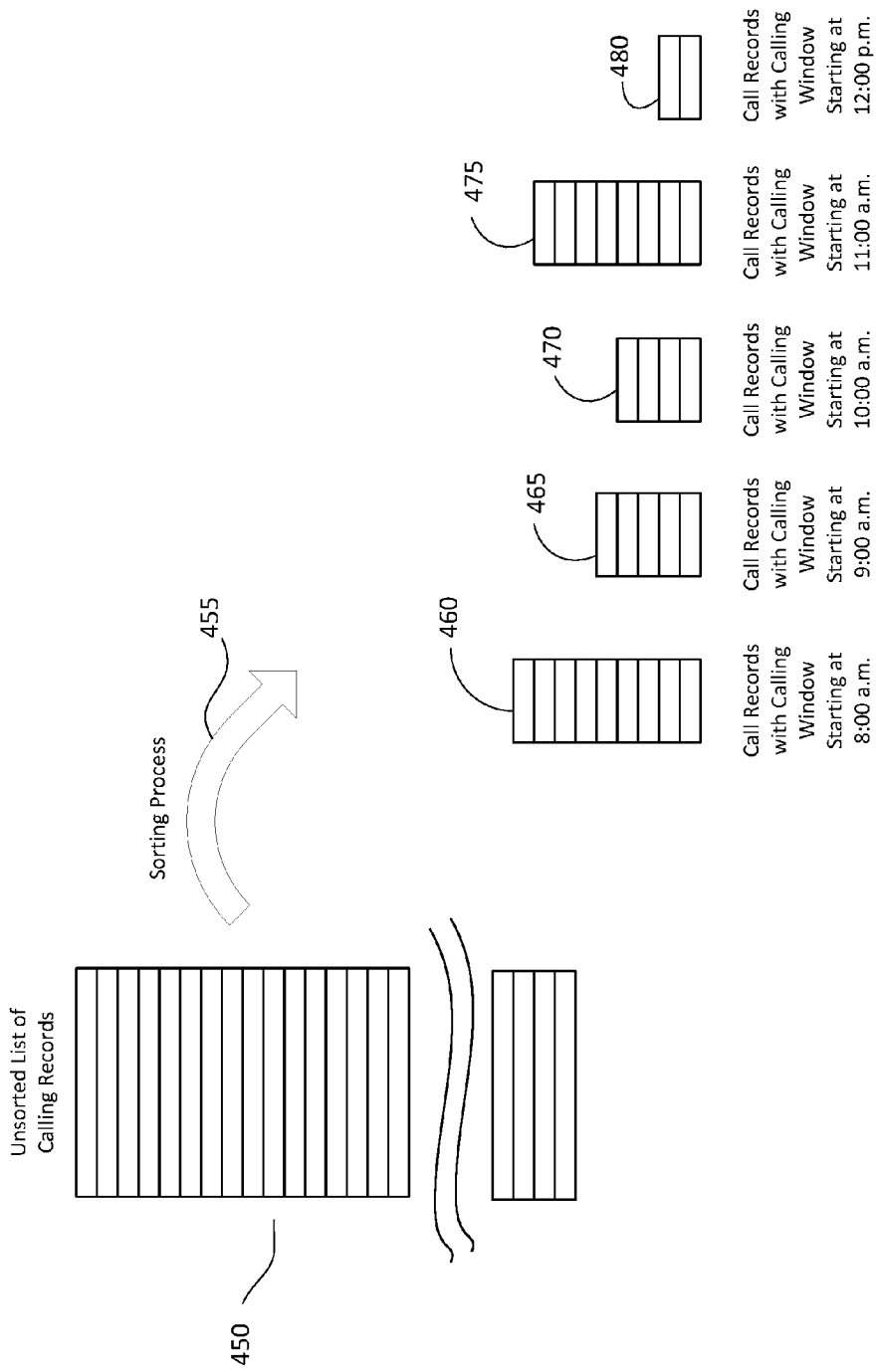

Process Flow—FIGS. 4A and 4B

FIG. 4A shows another embodiment of the processing involving the CRPC and call handler. This process functions to process a list so as to sort the records into sub-lists, which are then use to originate calls at the appropriate time. The process begins with retrieving a record in operation 405, ascertaining the associated geographical locations in operation 410, and using the geographical locations to further retrieve any state-specific regulations that may impact the calling windows in operation 415. Once this information is known, the adjusted calling windows can be determined in operation 420 and modified as necessary by the regulations in operation in operation 425.

At this point, the call record can be sorted into one of a plurality of sub-lists, which include other records that have a common start time for the calling window. In one embodiment, each list is characterized as having records having a common starting time, but not necessarily the same stopping time. In other embodiments, separate lists are defined for records having the same starting and stopping time.

FIG. 4B illustrates the sorting process conceptually. The process involves processing the master calling list 450 of calling records. The process 455 determines the calling window for each called party, and places that record in a queue 460-480. In this embodiment, the queues represent records having a common starting time. Thus, e.g., the first queue 460 has records where the calling window opens at 8:00 a.m. local time for the dialer. The next queue 465 has those records which can be started at 9:00 a.m. In some embodiments, each queue has sufficient records that the list cannot be expected to be exhausted, and any records not dialed by the end of the current hour are not further attempted, because the dialer is then processing the list beginning for the next hour. If the dialer may exhaust processing a list, it may then go back and attempt those records in prior lists which were not dialed, but a mechanism has to be in place for the dialer to know when the calling window closes. This can be accomplished by submitting each record to the CRPC to indicate when the stopping time is.

Figure 5:
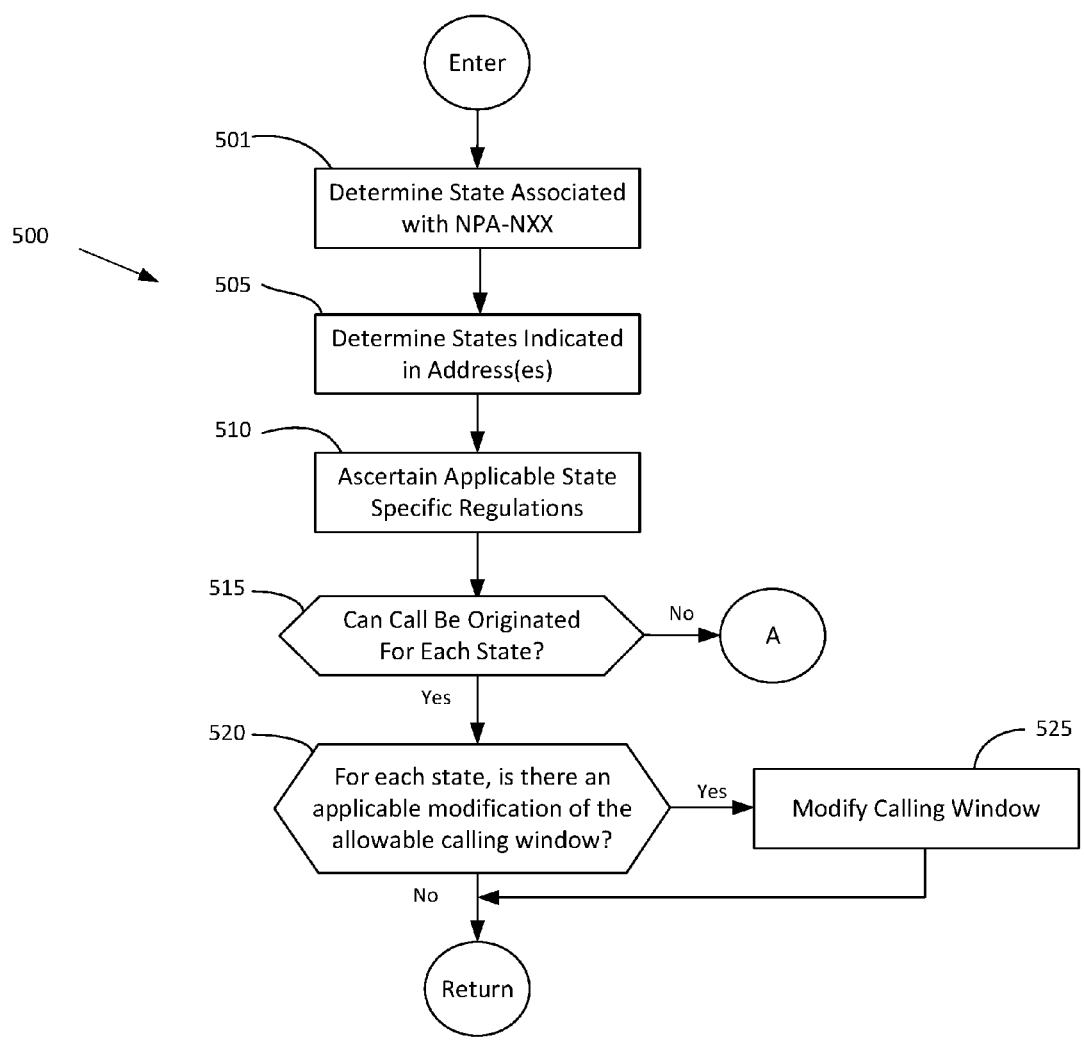

Process Flow—FIG. 5

The process flow of FIG. 5 illustrates in further detail the operations that may occur in some embodiments in operation 315 of FIG. 3 and operation 415 of FIG. 4. This process requires ascertaining the state associated with the NPA-NXX of the called telephone number in operation 501. This can be done by table lookup. Obviously, there is always a telephone number in the call record, and therefore at least one state can be identified. Next, the state(s) associated with the address(es) are identified in operation 510. Typically, there is at least one address involved, but in various cases there may be more than one. If so, each of the applicable states are determined from the address information.

Next, each of the applicable state regulations are ascertained in operation 510. This requires a table lookup for each state indicating whether there are any time or other restrictions for calls. Typically, this is dependent on the nature or purpose of the call. For example, telemarketing calls are typically more regulated than an informational call. Further, if there is an existing business relationship with the called party, this may qualify as an exemption in certain states.

A test in operation 515 ascertains whether any one of the state regulations could prohibit the call (e.g., essentially define a null calling window). If so, that telephone number should not be dialed, if it is not certain where the called party is located. For example, if any of the states involved list the number in their do-not-call database, then the number should not be called. Other states may have call attempt limits, and so the call attempt counter maintained for each telephone number should be checked against all the limits defined by the various state regulations. If this is the case, i.e., that the call cannot be originated, then the process continues to label A on FIG. 4. Essentially, the record is skipped with respect to placing it into a calling queue or dialing list.

Another test occurs in operation 520 to ascertain for each of the states associated with that call record whether there is any applicable modification of the calling window based on the state regulation. If so, then the calling window is modified appropriately in operation 525. For example, if one of the states requires starting at a later time in the morning, then the calling window is adjusted to reflect the later starting time. The process then returns back to FIG. 4. In this way, each of the possible states' regulatory limitations are considered. This provides an additional level of risk mitigation as opposed to only considering one state (e.g., the state associated with the NPA-NXX). By considering the limitations of all possible states involved, the process can be better ensure that the call is in compliance with respect to possible restrictions to the calling window.

Figure 6:
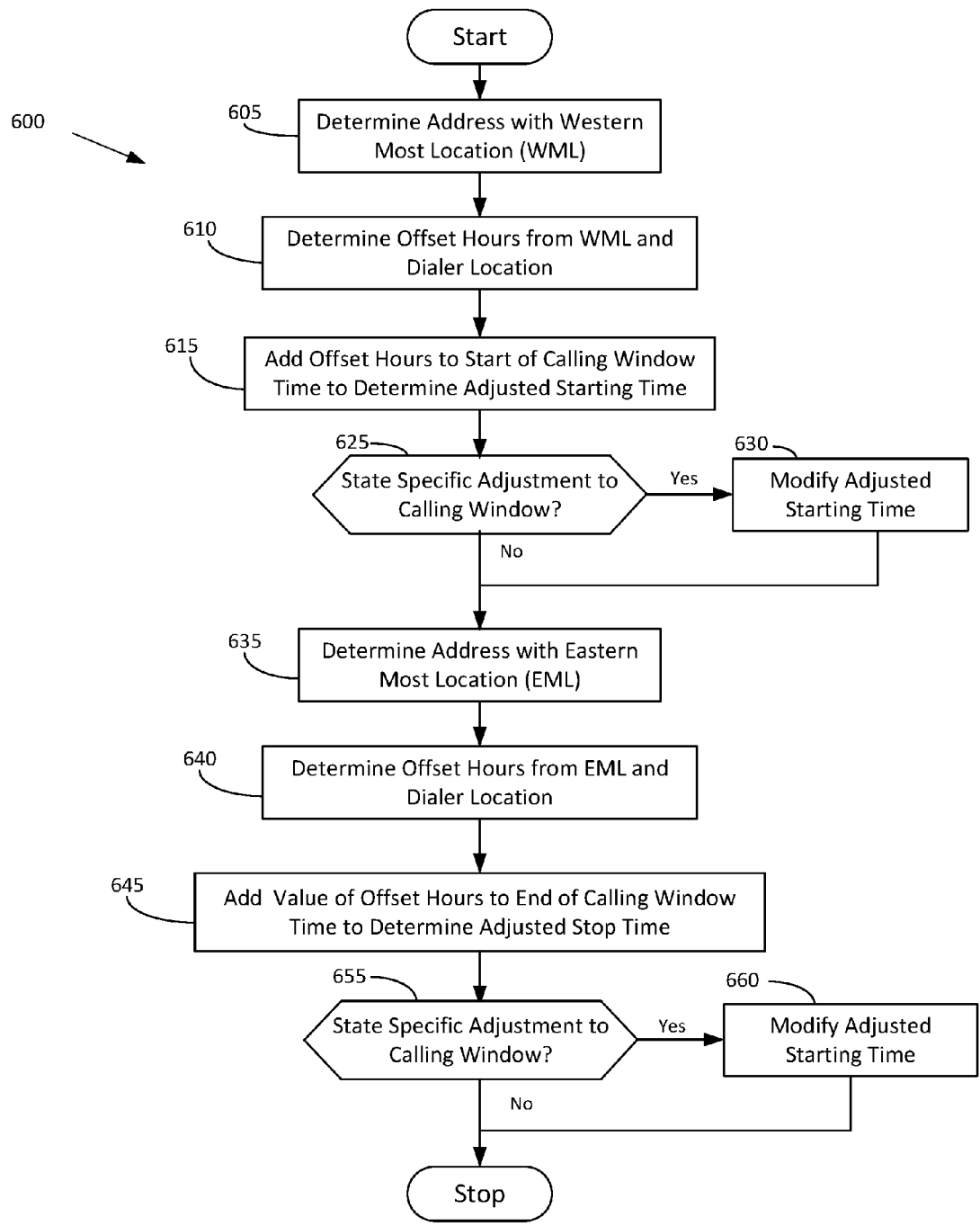

Process Flow—FIG. 6

The process flow of FIG. 4A showed an operation 420 for determining the adjusted calling window times. This is the time window (local to the dialer, or the dialer-located time zone) during which the dialer can originate calls to the called party. This adjustment takes into account the various time zones that the user may be located in, and minimizes the risk that the call will be outside the calling window for the called party, at their local time. This process flow does not illustrate any of the details for adjustments for any of the state-specific modifications to the calling window that may be necessary.

It should be noted that the operations shown in FIG. 6 may occur in a different order than shown. In this example, the process begins by determining the western-most location ("WML") of the geo-locations associated with the telephone numbers and addresses. This is to determine the associated time zone of that location. It may not be sufficient to merely use the state associated with the NPA-NXX of the called number and the addresses. That is because there are 14 states which straddle two time zones. These are: Alaska, Florida, Idaho, Indiana, Kansas, Kentucky, Michigan, Nevada (albeit only a 7.5 square mile portion), North Dakota, South Dakota, Oregon, Tennessee, and Texas. Thus, if the state is not one of these, then the time zone can be determine by a simple table lookup. If the state is one of these, then further information as to the city, zip code, or coordinates of the NPA-NXX are needed to ascertain the correct time zone.

The next step is to determine the "offset time" from the WML and the dialer location in operation 610. The "offset time" refers to the time zone difference from the time zone where the dialer is located (i.e., the dialer-located time zone) and the WML of all the addresses and telephone number. The "offset time" will be an integer value. If the WML location is east of the time zone of the dialer, then integer value is negative. For example, if the dialer is located in a city that is in the Central Time Zone and the WML of the party is an address is California, which is entirely in the Pacific Time Zone, then the offset time is equal to two (+2). It is not negative, because the WML is not east of the Central Time Zone. If the WML was in Georgia, which is the Eastern Time Zone, then the offset time is equal to minus one (−1). In summary, the time zone difference in this example is the number of time zones between the dialer location and the western most geo-location associated with the called party, and the value is negative if the WML is east of the dialer location.

Once the offset time in relation to the WML is determined, this value is added to the start of the (default) calling window time to produce the adjusting starting time in operation 615. The start of the calling window time typically is on the hour, and typically is 8:00 a.m. Thus, adding an offset time of two means the adjusted starting time would be: (8:00 a.m.+2=10:00 a.m.).

Next, a decision is made in operation 625 as to whether there is any state specific adjustment to the calling window start time. There will be a state associated with the telephone number and an address, and potentially two separate states if there are multiple addresses. The various restrictions associated with each state is examined to determine if there should be an adjustment to the starting time. If so, then in operation 630 the adjusted starting time is modified. Typically, the modification will involve adding time to the start of the calling window, not reducing it. If there is no adjustment, then the process flow continues.

Next, the process determines the eastern mode location ("EML") in operation 635. As suggested, this determines the eastern most location among the locations associated with the telephone number and addresses. Once the EML is determined, then the next operation involved determining the offset time from the EML to the location of the dialer. Again, the offset time will be an integer number. If the EML is east of the dialer's time zone, then the offset time is converted to a negative integer number. For example, if the dialer is located in a city that is in the Central Time Zone and the EML of the party is an address is California, which is entirely in the Pacific Time Zone, then the offset time is equal to two. If the EML was in Georgia, which is the Eastern Time Zone, then the offset time is equal to minus one.

A negative value of the EML offset time is added to the end of the calling window in operation 645. Thus, if the default stop time is 9:00 p.m., and the EML offset time is 2 hours, then the modified default stop time would be 7:00 p.m. in the time zone where the dialer is located. Next, a determination is made if operation 655 whether any state specific modifications would be required to modify the adjusted stop time. If so, the adjustment is made in operation 660, whereas if it is not made, the process flow stops.

The result of the process flow is that the calling windows comprising a modified adjusted start time and a modified adjusted stop time are determined. This indicates the allowable calling window for the record processed. This process is further illustrated in FIG. 7. A tabular depiction 700 of various time zones is shown. For the U.S., this involves the Hawaiian Time Zone 702, Alaskan Time Zone 704, Pacific Time Zone 706, Mountain Time Zone 708, Central Time Zone 710, Eastern Time Zone 712, and the Atlantic Time Zone 714. In this example, the dialer is presumed to be located in the Central Time Zone 710 (i.e., the "dialer-located time zone"), and the offset time values are shown with respect to the Central Time Zone, which is where the dialer is located.

Figure 7:
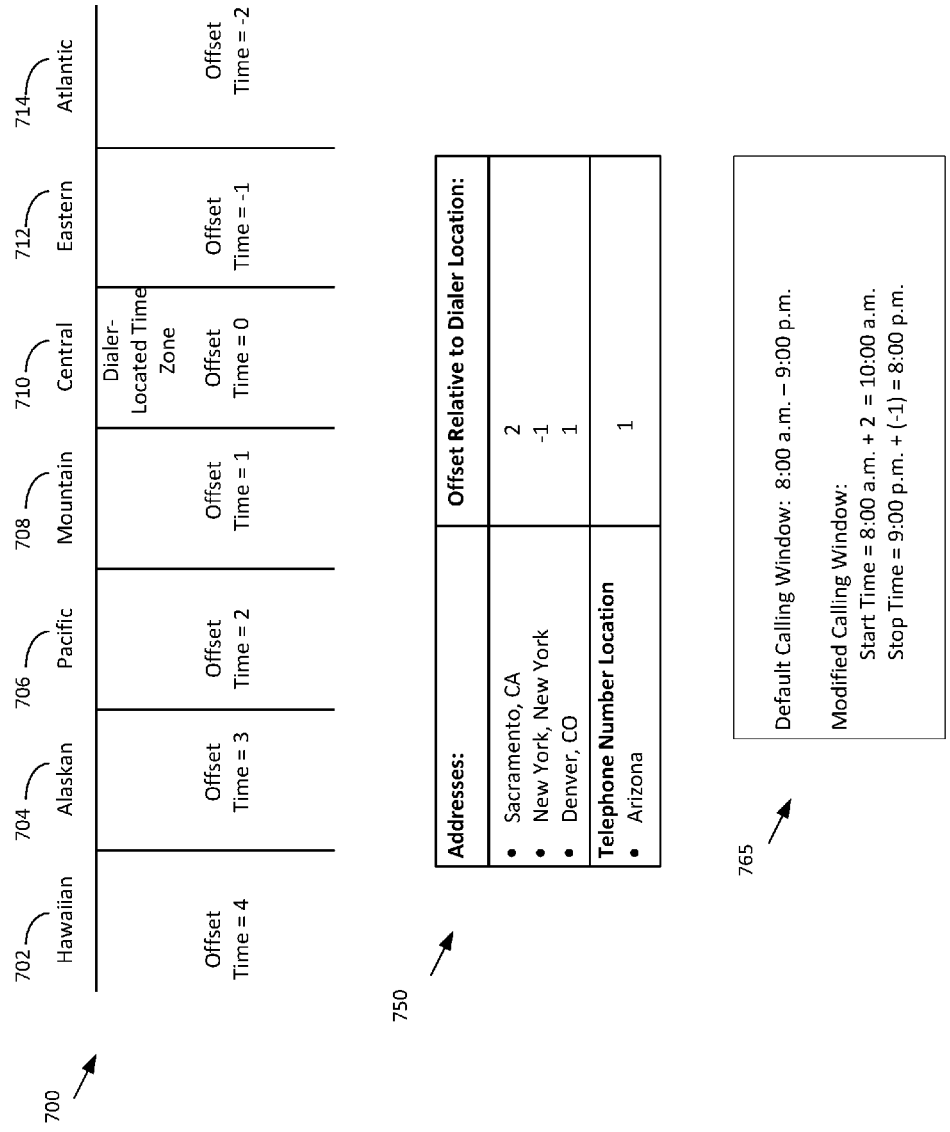
FIG. 7 shows one embodiment comprising various values associated with the algorithm to determine the calling window for a called party according to the concepts and technologies disclosed herein.

It is shown for illustration purposes a set of addresses included in a call record 750. For this call record, there are three addresses indicated, with locations indicated in Sacramento, Calif.; New York, N.Y.; and Denver, Colo. The corresponding times zones for these cities are Pacific Time Zone, Eastern Time Zone, and Mountain Time Zone. The adjusted start and stop times of the calling window, assumed to be a default time of 8:00 a.m. to 9:00 p.m. The WML is California, which has an offset time of two hours from the Central Time Zone. This value is added to the starting time of 8:00 a.m. to produce 10:00 a.m. as the adjusted starting time. The stopping time is determined by taking the EML, which is New York, which has an offset time of 1 hours. This value is made to be negative because it is east of the dialer-located time zone and added to the default stopping time. (Effectively subtracting the offset time value from the stopping time.) This produces an adjusted stopping time of 8:00 p.m. Thus, the calling window for this call record for the dialer is between 10:00 a.m. and 8:00 p.m. central time. This ensures that the call will be within 8:00 a.m. and 9:00 p.m. regardless of whether the person is located in California (Pacific Time Zone) or New York (Eastern Time Zone). Not shown in FIG. 7 is the impact of any state specific regulations which may further modify the adjusted calling window.

It should be appreciated that the above algorithm is determined on a record by record basis, based on the information in that record. Further, the above scheme can function with the dialer located in any time zone, including e.g., the Hawaiian time zone. If that were the case, then for the same record shown in FIG. 7, the WML offset time would be −2 hours (Hawaiian Time Zone to Pacific Time Zone and a negative value since the WML is east of the dialer time zone) and the EML offset time would be −5 hours (Hawaiian Time Zone to Pacific Time Zone, again, with it also being a negative value). Thus, the adjusted starting time would be 8:00 a.m.-2=6:00 a.m. and the adjusted stopping time would be 9:00 p.m.-5=4:00 p.m. In this example, the adjusted calling window is 6:00 a.m. to 4:00 p.m., absent any state level regulations that further modify these times. For purposes of illustration, the dialer is presumed to be located in the U.S., though the principles could be applied for locations outside the time zones covering the U.S.

Exemplary Computer Processing Device

Figure 8:
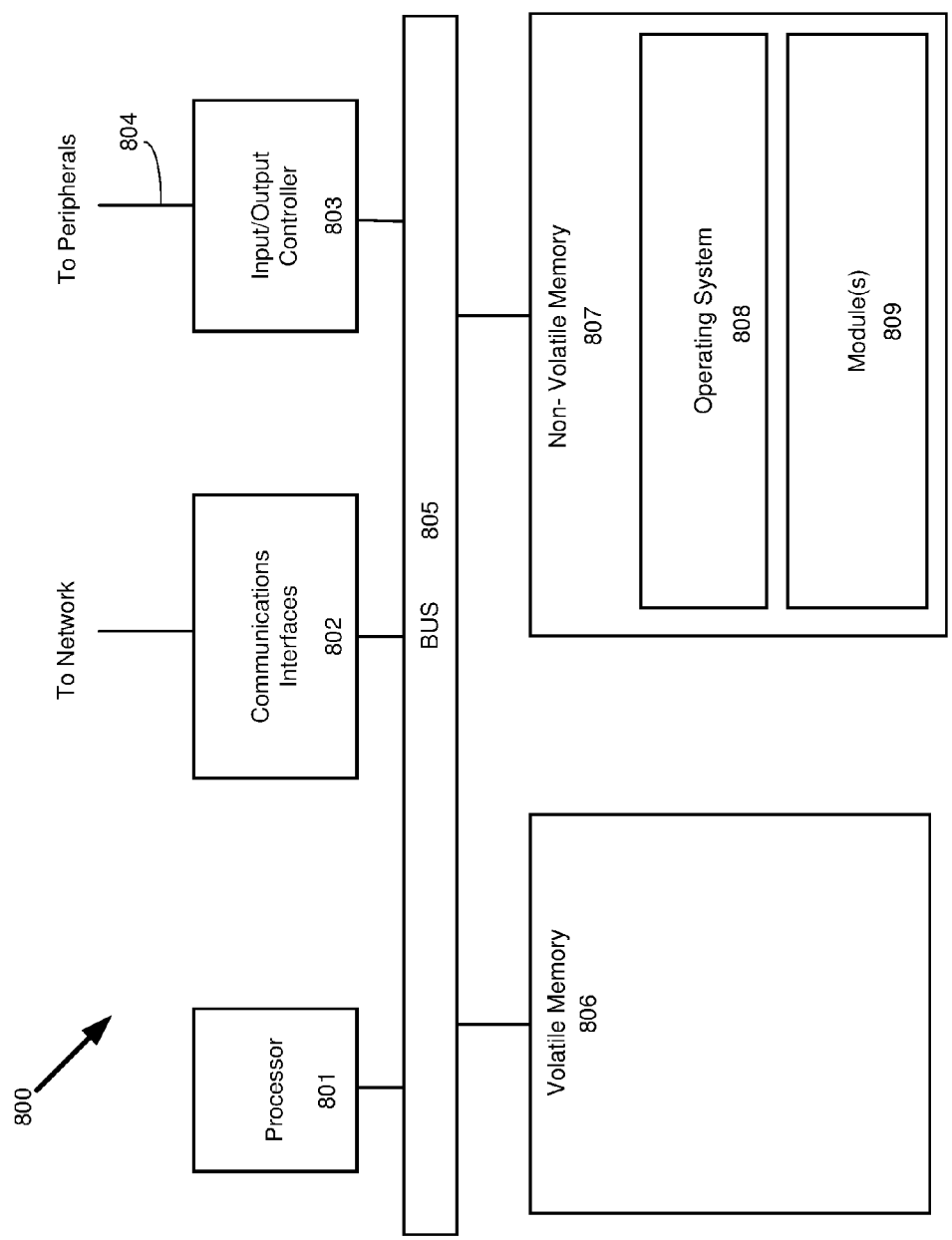
FIG. 8 is an exemplary schematic diagram of a computer processing system that may be used in one embodiment of the contact center architecture to practice the technologies disclosed herein.

FIG. 8 is an exemplary schematic diagram of a computer processing system that may be used in embodiments of various architectures, such as components shown in the architecture 100 of a contact center in FIG. 1 to practice the technologies disclosed herein. In general, the term "computer processing system" may be exemplified by, for example, but without limitation by any specially configured or programmed: personal computer, server, desktop computer, tablet, notebook, laptop, distributed processing system, server, blade, and the like, as well as any combination of specialized devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. A "call handler" and "dialer" as used herein would be interpreted by one skilled in the art as a special purpose processing system, performing functions that are not typical of a generic computer and one that is specially configured to perform the functions disclosed herein. This also may be the case for the other components disclosed herein including the various dialing components, SMS gateway, dialing list storage systems, etc.

As shown in FIG. 8, the processing system 800 may include one or more computing processors 801 that may communicate with other elements within the processing system 800 via a bus 805. The computing processor 801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 800 may also include one or more communications interfaces 802 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 803 may also communicate with one or more input devices or peripherals using an interface such as, but not limited to: a keyboard, a mouse, a touch screen/display input, microphone, pointing device, etc. The input/output controller 803 may also communicate with output devices or peripherals, such as displays, printers, speakers, headsets, banner displays, via interface 804.

The computing processor 801 may be configured to execute instructions stored in volatile memory 806, non-volatile memory 807, or other forms of computer readable storage media accessible to the processor 801. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. For example, the non-volatile memory 807 may store one or more modules 809 that may perform the above-mentioned process flows and/or operating system code 808 containing instructions for performing the process and/or functions associated with the technologies disclosed herein. The module(s) 809 may also access, generate, or store related data 808, including, for example, the data described above in conjunction with performing the various aspects of geo-location data, time zone data, or other data used in the processing described herein, which may be stored in the non-volatile memory 807, as well as in the volatile memory 806. This would include, but is not limited to: time zone mapping data, geo-location to time zone and/or state level regulatory information, state level restrictions modifying the calling windows, etc. The volatile memory 806 and/or non-volatile memory 807 may be also used to store other information including, but not limited to: records, applications, programs, scripts, source code, object code, byte code, compiled code, interpreted code, machine code, executable instructions, or the like. These may be executed or processed by, for example, the computing processor 801 and may form a part of, or may interact with, the module(s) 809.

The technologies described herein may be implemented in various ways, including as computer program products comprising memory storing instructions causing a processor to perform the specialized and non-generic operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for originating a call to a called party, the system comprising:
a call record processing component located in a call origination time zone comprising a first computer processor configured to:
retrieve a call record from a database, the call record comprising a telephone number of the called party and a plurality of postal addresses associated with the called party;
determine a western-most location from the plurality of postal addresses and the telephone number;
determine a first offset time as a first time zone difference between a western-most time zone of the western-most location and the call origination time zone;
determine an eastern-most location from the plurality of postal addresses and the telephone number;
determine a second offset time as a second time zone difference between an eastern-most time zone of the eastern-most location and the call origination time zone;
ascertain a calling window defined by a starting time and a stopping time in the call origination time zone for originating the call to the called party using the first offset time to determine the starting time and the second offset time to determine the stopping time;
determine the call to the called party can be originated within the starting time and the stopping time of the calling window based on a current time in the call origination time zone; and
transmit a signal to originate the call to the called party to a call originator component, wherein:
the call originator component comprises a second computer processor configured to:
receive the signal from the call record processing component to originate the call to the called party, the signal indicating the telephone number, and
originate the call to the called party in response to receiving the signal.

2. The system of claim 1, wherein the call originator component is a text-based dialer and the call is a SMS text-based call.

3. The system of claim 1, wherein the call originator component is a voice-based telephone dialer and the call is a voice-based SIP call.

4. The system of claim 1, wherein the first computer processor is configured to determine the eastern-most location from the plurality of postal addresses and the telephone number involves determining a location identified by a NPA-NXX portion of the telephone number.

5. The system of claim 1, wherein the first computer processor is configured to ascertain the calling window using the first offset time to determine the starting time and the second offset time to determine the stopping time by:
adding the first offset time comprising a positive integer value to a default starting time, thereby producing the starting time of the calling window; and
adding the second offset time comprising a negative integer value to a default stopping time, thereby producing the stopping time of the calling window.

6. The system of claim 5, wherein the default starting time is 8:00 a.m. and the default stopping time is 9:00 p.m.

7. The system of claim 1, wherein the first computer processor is configured to ascertain the calling window for originating the call to the called party by using a regulation from a first state in the western-most location defining a first state specific calling window to determine the starting time.

8. A method for originating a call to a called party from a dialer in a dialer-located time zone, the method comprising:

retrieving a call record by a call record processing component from a database, the call record comprising a telephone number of the called party and a plurality of postal addresses associated with the called party;

determining a western-most location by the call record processing component from the plurality of postal addresses and the telephone number;

determining a first offset time by the call record processing component as a first time zone difference between a western-most time zone of the western-most location and the dialer-located time zone;

determining an eastern-most location by the call record processing component from the plurality of postal addresses and the telephone number;

determining a second offset time by the call record processing component as a second time zone difference between an eastern-most time zone of the eastern-most location and the dialer-located time zone;

ascertaining a calling window defined by a starting time and a stopping time in the dialer-located time zone for originating the call to the called party by the call record processing component using the first offset time to determine the starting time and the second offset time to determine the stopping time;

determining the call to the called party can be originated within the starting time and the stopping time of the calling window based on a current time in the dialer-located time zone; and originating the call by to the called party by transmitting a call origination signal to the dialer to originate the call to the called party in response to determining the call to the called party can be originated within the starting time and the stopping time of the calling window.

9. The method of claim 8, further comprising:

determining a western-most located state by the call record processing component from the plurality of postal addresses and the telephone number;

determining a calling window regulation of the western-most located state;

determining the calling window regulation is applicable to the call to the called party; and modifying the starting time by the call record processing component using the calling window regulation of the western-most located state.

10. The method of claim 8, wherein the call originated to the called party comprises a voice telephony call.

11. The method of claim 8, wherein the call originated to the called party comprises a text call.

12. The method of claim 8, wherein determining the western-most location by the call record processing component from the plurality of postal addresses and the telephone number involves determining the western-most location from the telephone number using a NPA-NXX of the telephone number.

13. The method of claim 8, wherein ascertaining the calling window for originating the call to the called party by the call record processing component comprises:

adding the first offset time comprising a positive integer value to a default starting time, thereby producing the starting time of the calling window; and adding the second offset time comprising a negative integer value to a default stopping time, thereby producing the stopping time of the calling window.

14. The method of claim 13, wherein the default starting time is 8:00 a.m. and the default stopping time is 9:00 p.m.

15. A non-transitory computer readable medium storing instructions for operating a dialer located in a dialer-located time zone to originate originating a call to a called party that when executed by a computer processor cause the computer processor to:

retrieve a call record from a database, the call record comprising a telephone number of a called party and a plurality of postal addresses associated with the called party;

determine a western-most location from the plurality of postal addresses and the telephone number;

determine a first offset time as a first time zone difference between a western-most time zone of the western-most location and the dialer-located time zone;

determine an eastern-most location from the plurality of postal addresses and the telephone number;

determine a second offset time as a second time zone difference between an eastern-most time zone of the eastern-most location and the dialer-located time zone;

ascertain a calling window defined by a starting time and a stopping time in the dialer-located time zone for originating a call to the called party using the first offset time to determine the starting time and the second offset time to determine the stopping time;

determine the call to the called party can be originated within the starting time and the stopping time of the calling window based on a current time in the dialer-located time zone; and cause the dialer originate the call to the called party by transmitting a call origination signal to the dialer to originate the call to the called party in response to determining the call to the called party can be originated within the starting time and the stopping time of the calling window.

16. The non-transitory computer readable medium of claim 15, wherein the dialer is a text-dialer and the call is a text-based call.

17. The non-transitory computer readable medium of claim 15, wherein the instructions when executed further cause the computer processor to:

determine a western-most located state from the plurality of postal addresses and the telephone number;

determine a calling window regulation of the western-most located state;

determine the calling window regulation is applicable to the call to the called party; and modify the starting time of the calling window using the calling window regulation of the western-most located state.

18. The non-transitory computer readable medium of claim 15, wherein the instructions when executed further cause the computer processor to:

add the first offset time to a default starting time of 8:00 a.m. to produce the starting time; and subtract the second offset time from a default stopping time of 9:00 p.m. to produce the stopping time.

19. The non-transitory computer readable medium of claim 18, wherein the instructions when executed further cause the computer processor to:

determine the eastern-most location is in a time zone east of the dialer-located time zone.

20. The non-transitory computer readable medium of claim 15, wherein the instructions when executed further cause the computer processor to:
   determine a corresponding location of the telephone number by using a NPA-NXX portion of the telephone number to determine the corresponding location.

* * * * *